United States Patent [19]

Beers

[11] 3,893,864

[45] July 8, 1975

[54] QUICK-CURING WATER RESISTANT SILICA-ALKALI METAL COATINGS AND PROCESSES THEREFOR

[75] Inventor: Ronald Wentworth Beers, Spring, Tex.

[73] Assignee: Exxon Research and Engineering Company, Linden, N.J.

[22] Filed: Dec. 20, 1973

[21] Appl. No.: 426,438

[52] U.S. Cl. .................................... 106/1; 106/287
[51] Int. Cl. .............................................. C09d 5/10
[58] Field of Search.......... 106/1, 84, 287 S, 287 SB

[56] References Cited
UNITED STATES PATENTS

| 3,475,185 | 10/1969 | von Freyhold | 106/1 |
| 3,615,730 | 10/1971 | Law et al. | 106/1 |
| 3,660,119 | 5/1972 | Oken | 106/1 |

Primary Examiner—Lewis T. Jacobs
Attorney, Agent, or Firm—David A. Roth

[57] ABSTRACT

An exceptionally rapid-curing, water based silica-alkali metal binder used with inorganic pigments, preferably zinc.

18 Claims, No Drawings

QUICK-CURING WATER RESISTANT SILICA-ALKALI METAL COATINGS AND PROCESSES THEREFOR

CROSS-REFERENCE TO RELATED APPLICATIONS

This application is not formally related to any earlier applications but it is an improvement over several commonly assigned issued patents and pending applications.

BACKGROUND OF THE INVENTION

Water solutions of alkali silicates are commonly used binders in zinc rich inorganic coatings. Some colloidal dispersions of silica can also be used as binders. Depending on the alkali used for the solution of the silica or the colloidal dispersion and the ratio of alkali to silica these coatings have been classed as either self-curing or requiring a post cure to achieve an acceptable degree of water resistance in say 8 hours.

Examples of these coatings which are commercially available are RUST-BAN 190 (a sodium silicate solution requiring a post curing treatment such as 10% phosphoric acid in water) and RUST-BAN 191 (a sodium-lithium silicate solution which is classed as self-curing). The different cure characteristics of these two coatings is that one (RUST-BAN 190) requires about one month exposure to the atmosphere before it will resist a heavy rain while the RUST-BAN 191 will resist a heavy rain after only about eight hours exposure to the atmosphere depending on the ambient temperature and humidity. Therefore relatively speaking the sodium-lithium vehicle is self-curing.

However, in actual practice, especially in the marine industry which is a major user of these inorganic zinc rich coatings, weather conditions are such that the coating must become completely resistant to rain, fog or extended periods of drizzle in a matter of only one or two hours after application and under less than desirable temperatures such as 50°F and 70–80% relative humidity.

Under these adverse conditions currently available, so called self-curing systems such as RUST-BAN 191 redissolve causing failure of the coating and requiring reblasting and recoating. To offset this problem many end users of these water base inorganic coatings have switched to using the solvent based ethyl silicates because they cure by absorbing moisture from the air. U.S. Pat. Nos. 3,320,082, 3,180,746, and 3,130,061 are relevant prior art patents.

SUMMARY OF THE INVENTION

Water-based silica-alkali metal binders used with zinc powder as a protective coating can unexpectedly be made moisture resistant within two hours after application if compounded with certain proportions of an ammonia stabilized colloidal silica.

DETAILED DESCRIPTION OF THE INVENTION WITH PREFERRED EMBODIMENTS

To solve the postulated problem above, using a water based material, it was conceived that if a mechanism could be found which would initiate polymerization of the silicate solution as soon as the water evaporated then a polymer of sufficient molecular weight would develop rapidly, within an hour or two, which would resist all conditions of early exposure down to 40°F.

Polymerization of silicates and colloidal silica increases as the pH drops until it reaches a maximum for most systems at pH of 5–6. Alkali silicate solutions usually have a pH in the range of 10.5–11.5 due to the presence of fixed alkalis such as sodium, lithium or potassium.

As the system dries upon evaporation of the water, mobility of the alkali cation is reduced, the solids content increases, and collision and agglomeration of silica particles takes place. As the alkali is neutralized by absorption of $CO_2$ from the air or slowly removed from the film by leaching from condensation, fog or rain the silicate particles become more acidic and the crosslinking reaction with the zinc dust and polymerization process begins. The polymerization continues until a tightly crosslinked film is obtained. Rapid polymerization can be achieved by neutralizing the alkali immediately by post curing with a 10% solution of an acid such as phosphoric. This is the current recommendation for rapid water resistance.

It is theorized that the polymerization of silicates takes place through the mechanism of a silicic acid intermediate which immediately condenses with silanol hydroxy groups on adjacent silica particles forming siloxane bonds (Si—o—Si) thus forming a densely cross-linked $SiO_2$ polymer which becomes completely water insoluble at very low molecular weights. Thus, the more rapidly this rate of polymerization takes place the quicker desired water insensitivity of the coating occurs.

It is one of the advantages of this invention that a water borne silicate vehicle is provided which will attain a state of complete water resistance within a little as one hour after application without the use of any post curing chemicals such as acid solutions, acid salt solutions, heavy metal salts or high temperatures.

A further advantage of this invention is a water borne silicate vehicle which will form coatings having such an early resistance to water, without a loss in the shelf life compared to existing water based products.

An additional advantage of this invention is that the zinc rich water based coatings will develop water resistance even at low temperatures (50°F) within as little as one hour of application to rain, fog or condensation with or without the use of the above mentioned commonly used curing agents while still retaining at least five hours pot life after the zinc dust is mixed with the vehicle.

The water resistant vehicle of the invention is not limited to application to various metals, but may also be used as a clear sealer, adhesive, impregnant for wood or paper and as a binder for ceramics or castings in the foundry trade.

The prior art discloses the use of the silicates of fixed alkalis such as sodium, potassium, lithium or quaternary ammonium silicates or mixtures thereof. The prior art also discloses the use of alkali stabilized colloidal silicas which differ from the silicates in that they are generally considered to be truly colloidal rather than ionic in nature.

As pointed out by Harman (J. Phys, Chem., Volume 31, 616–625;(1927) yellow silicomolybdic complex acid is formed by reaction of molybdic acid with ionic silica but not with colloidal silica. Polymeric silica such as is present in colloidal silica dispersions does not give this colormetric reaction and thus can be used to identify between colloidal silica and ionic silicates solutions such as are mentioned above.

The above silicates and colloidal silicas previously disclosed in the art all suffer from the same basic problem of water sensitivity after application. While the degree of sensitivity may vary from a few days to several weeks the practical goal of obtaining a truly water resistant coating in one hour or less based on water borne silica or silicate vehicles has not been achieved without the use of post curing acid solutions, salts, etc., mentioned above.

The only alternative has been to turn to the self-curing, non-aqueous based solvent borne vehicles such as the ethyl silicates. These become water resistant 20 to 30 minutes after application. By water resistant it is meant resistance to rain, high humidity spray, condensation or fog, particularly the last two. Present systems of the art based on water borne silica or silicate vehicles will not resist fog or condensation until they have dried for several days in most instances.

In essense the disclosure encompasses an overall inventive concept which in its entirety comprises several statutory classes. These are:

a. process of preparing novel water based alkali-silica/ammonia stabilized colloidal silica binder compositions.

b. the binder compositions of (a) per se c. the new fast forming water resistant coating composition utilizing the binder composition of (a) with zinc particulates d. the process which comprises the in situ reaction of the composition of (a) with zinc particulates to result in the coating composition of (b)

The binder component of the moisture resistant, fast, self-curing coating compositions of this invention comprise a critical combination of a silicate or colloidal silica and a fugative cation, preferably ammonia stabilized colloidal silica. It has been found that when a silicate solution or a colloidal silica is combined with the proper ratio of a colloidal silica sol, stabilized with a fugitive cation, specifically the $NH_4+$ ion, binder vehicles are formed which have excellent shelf life, pot life of 5 hours or more when mixed with zinc dust pigment, and films of these zinc rich coatings have unusually rapid self-curing properties. These formulations provide water and moisture resistant films with excellent corrosion resistance in as little as one hour after application.

The alkali metal or quaternary ammonium silicates or sols have silica contents between 10 to 60% preferably 15 to 50% and most preferably 15 to 40% by weight.

The molar ratio of $SiO_2$ to alkali metal ratio expressed as $Me_2O$ ($SiO_2/Me_2O$) will be from 2.5 to 5.0 ($SiO_2$); from about 0.75 to about 1.00 ($Li_2O$); from about 0.05 to 2.5 ($Na_2O$). The details of the sodium-lithium silicate solution are covered in U.S. Pat. No. 3,180,746 which is hereby incorporated by reference in its entirety.

Suitable metal-free organic quaternary ammonium silicates include alkylethanol ammonium silicates such as; methytriethanol amine silicate, tetraethanal ammonium silicate, diethanal morpholinium silicate, and hexaethanol-ethylene diammonium silicate, dissolved in an aqueous medium. The mole ratios of silica to organic ammonium ion may vary between 1.0 to 20.0, preferably 5 to 20, most preferably 5 to 15.

THE ORGANIC QUATERNARY AMMONIUM SILICATE BINDER COMPONENT — GENERAL FORMULAS AND SPECIFIC COMPOUNDS

It is postulated that the organic quaternary ammonium silicate binder component of the inventive composition can be broadly characterized by the formula:

$$X(N_nR_p{}^s)_2O \cdot YSiO_2 \cdot ZH_2O$$

wherein:

N represents a nitrogen atom;

$n$ is a small integer, less than 10 and preferably less than five;

X, and Z and Z represent numbers defining the relative amounts of each of the component parts of the compound. X is 1, Y is preferably between 0.5 and 20, Z is preferably between 0 and 99;

R represents alkyl radicals containing between about 1 and 20 carbon atoms, at least two of which are omega hydroxy alkyl groups (preferably two or more of these R groups are ethanol groups and other derivatives of ethanol groups), up to four groups are associated with each N;

$p$ is at least 4, indicating total R groups; and $s$ is an integer from 1 to $p$, indicating the number of different types of R groups.

In a more specific sense, it is believed that the organic silicate binder components useful in connection with this invention can be characterized by the formula:

$$X(NR_1R_2R_3R_4)_2O \cdot YSiO_2 \cdot ZH_2O$$

wherein N, X, Y and Z have the significances noted above and $R_1$, $R_2$ $R_3$ and $R_4$ represent alkanol radicals containing between about 1 and 20 carbon atoms.

PREPARATION OF THE SILICA OR QUATERNARY AMMONIUM SILICATE COMPONENTS OF THE BINDER COMPOSITIONS OF THE INVENTION

The silica or silicate components of this invention may be prepared in a number of ways. Such methods include, for example:

a. Removing the alkali metal ion from alkali metal organic ammonium silicates by use of a suitable base exchange resin;

b. Disolving sodium-free silica in sodium-free hydroxalated organic ammonium silicates;

c. Dissolving sodium-free silica in sodium-free tetraethanol ammonium silicate solutions;

d. The sodium may be leached from the less soluble sodium quaternary ammonium silicate crystals;

e. Reacting ammonia and ethylene oxide with finely divided silica hydrate or silica gel, or a colloidal silica sol.

CONCENTRATION AND $SiO_2$ CONTENT OF COMPONENTS OF BINDER FORMULATIONS

Aqueous solutions of binder components are prepared with mol ratios of silica to organic alkali ion as high as 20, or even greater, and containing 50% or more of $SiO_2$. The upper limit of concentration depends on the consistency of the final mixture desired and, when modified, by the limits at which precipitation or gelation may occur.

A typical commercially available organic silicate which can be used in this invention is Quram 220 or a blend of Quran 220-sodium silicate (1:1 by weight).

Potassium silicates commonly used in the trade with $SiO_2/Me_2O$ ratios of 2.0–4.0 by weight and 20% to 30% $SiO_2$ were also tested with the ammonia stabilized colloidial silica in a zinc rich coating. These compositions were not as water resistant as the sodium-lithium silicates tested but were far superior to compositions containing only potassium silicate and zinc dust with no ammonia stabilized colloidal silica.

Sodium-lithium silicates are most preferred. Lithium silicates are next in order of preference. Sodium silicates are unacceptable for this application, since they do not become water resistant until the level of ammonia stabilized colloidal silica becomes so high that the system becomes unstable when zinc dust is added because the entire system sets up within a few minutes after the zinc is mixed in.

The preferred ammonia stabilized silica sol in this invention is an aquasol containing 20–40% $SiO_2$ with an $SiO_2/NH_3$ ratio of 100 to 150 by weight and containing less than 0.1% alkali metal ions. Methods of manufacture and composition of these aquasols are covered in U.S. Pat. No. 2,574,902, which is hereby incorporated by reference in its entirety. The invention is further illustrated by the following examples.

A series of silica containing components were prepared as follows:

The compositions in Examples 1 thru 4 result in a unique silica dispersion which is different in physical characteristics, appearance and chemical reactivity. When the ammonia stabilized colloidal suspension is added to the indicated ionic silicate solution or colloidal silica sols an immediate reaction occurs and the reactants change from opalescent, translucent or clear solutions to a milky opaque dispersion of what appears to be a high molecular weight polysiloxane having a large particle size compared to silicate solutions or sols, which require the use of surfactants and/or suspending aides to keep them in suspension. The latex further assists this suspension but more importantly allows the system to adhere continuously to very smooth surfaces such as non sandblasted steel, polished steel, glass, smooth concrete or the like. Surprisingly, the use of reactive type laticies, which contain hydroxyl or carboxyl functional groups do not impair solvent resistance of the zinc rich coatings which are frequently used as anticorrosive linings for solvent tanks or ocean going crude oil tankers. The levels of these reactive laticies should be between 0% and 30% by weight of the composition of the liquid vehicle otherwise softness, slow cure rates and water sensitivity may result.

| Example 1 | Alkali Metal Silicate Solution |
|---|---|
| Water | 52.0 |
| Amine treated bentonite clay | 0.5 |
| Sodium alkyl-aryl sulfonate (45%) | 2.0 |
| Carboxylated styrene butadiene latex (45%) | 82.0 |
| Alkali metal silicate solution (27%) | 415.0 |
| Ammonia stabilized silica aquasol (30%) | 415.0 |

| Example 2 | Quarternary Ammonium Silicate |
|---|---|
| Water | 434.0 |
| Amine treated bentonite clay | 0.5 |
| Methyltriethanol amine silicate (50%) | 88.0 |
| Sodium silicate solution (37%) | 237.8 |
| Ammonia stabilized aquasol (30%) | 122.0 |

| Example 3 | Colloidal Silica Sol-Lithium Stabilized |
|---|---|
| Water | 18.0 |
| Amine treated bentonite clay | 0.5 |
| Colloidal silica-lithium stabilized | 916.0 |
| Carboxylated styrene-butadiene latex (45%) | 82.0 |
| Sodium alkyl-aryl sulfonate | 2.0 |
| Ammonia stabilized aquasol (30%) | 83.0 |

| Example 4 | | Alkali Metal Silicate Solution |
|---|---|---|
| Water | | 52.0 |
| Potassium dichromate (0.1%) | | 0.6 |
| Alkali metal silicate solution (27%) | 415 | 622.0 |
| Ammonia stabilized silica aquasol (30%) | 415 | 208.0 |
| Amine treated bentonite clay | | 0.5 |

| Example 5 | Parts by wt. |
|---|---|
| Vehicle of Example 1 | 100.00 |
| Zinc Dust Powder | 326.00 |

| Example 6 | Parts by wt. |
|---|---|
| Vehicle of Example 2 | 100.00 |
| Zinc Dust | 326.00 |

| Example 7 | Parts by wt. |
|---|---|
| Vehicle of Example 3 | 100.00 |
| Zinc Dust Powder | 326.00 |

| Example 8 | Parts by wt. |
|---|---|
| Vehicle of Example 1 | 100.00 |
| Red Iron Oxide pigment 0.2–0.5μ | 100.00 |
| Natural Calcium Carbonate 20–40μ | 16.00 |

Example 9

An especially preferred binder composition is prepared from the following material ingredients:

| Material | Pounds | Oz. | Bulking Factor | Gallons | % By Weight |
|---|---|---|---|---|---|
| A Water | 133 | | .1205 | 16.03 | 5.49 |
| B Bentone | 1 | 4 | .0500 | 0.06 | 0.05 |
| C Sodium Alkyl Aryl Sulfonate | 5 | | .0864 | 0.43 | 0.21 |
| D Carboxylated Styrene Butadiene | 210 | | .1205 | 25.30 | 8.67 |
| E Sodium-Lithium Silicate | 1765 | | .1008 | 177.91 | 72.88 |
| F Ammonia Stabilized Silica | 305 | | .1000 | 30.50 | 12.59 |
| G Defoamer (2,4,7,9-tetramethyl-5-decyne-4-7 diol) | 2 | 8 | .1230 | 0.31 | 0.11 |
| Gross Charge | 2421 | 12 | | 250.54 | 100.00 |
| New Yield | | | | 243.00 | 97.0% |
| | | | | Theoretical Yield | |

A typical preferred procedure for preparing a preferred binder composition of the invention using the materials indicated above is as follows:

1. Add A to 55 gallon drum. Start mixer and add B. Stir 10 minutes.
2. When A and B are homogenious, add C and D in that order with agitation.
3. When C and D are completely stirred in, pour into Kady vat (260 gal.). add E to a rate of 10 gal./min. with agitation just making a vortex.
4. When all of E has been added, add F at 10 gal./min.
5. Stir 10 minutes after addition of F is complete and add G. Stir 5 minutes and submit sample to Control Lab for check of spec.
6. When approved, filter thru 80 mesh silk sack. Hold ½ pint retain sample.

In general this procedure was followed to prepare all the above examples.

The typical specifications on this binder will be as follows:

Wt./Gal at 77°F (Min.) 9.51 - (Max.) 9.81
K.U. Vis. at 77°F (Min.) 65 - (Max.) 75 Stormer A coating composition was formulated from 100 g of this binder composition and 325 grams of a commercial zinc dust having a mean particle size of from 7-9 u.

This formulation was applied to an experimental test panel in a wet film thickness of about 6 to 10 mils.

The wet film was allowed to dry and formed a hard dry adherent film in about 2 hours.

At the 2 hour point, the panel was placed in a 100% fresh water humidity cabinet for 24 hours. The film was then examined. No dissolving of the film was observed after being subjected to this rather severe humidity test.

In order to further illustrate the invention, some of the compositions of preceding Examples as well as newly formulated compositions were evaluated and compared to prior art compositions.

The formulation of these compositions is detailed in TABLE I. The performance of these compositions, particularly with regard to water resistance of the resulting coatings is summarized in TABLE II.

TABLE I and TABLE II are as follows:

TABLE I

COLLOIDAL SILICA SUBSTITUTIONS IN WATER RESISTANT FORMULATIONS

| | A | B | C[1] | D[2] | E | F | G | H[3] | I[4] | J | K |
|---|---|---|---|---|---|---|---|---|---|---|---|
| Bentonite | 0.5 | 0.5 | 0.5 | 0.5 | 0.5 | 0.5 | 0.5 | 0.5 | 0.5 | 0.5 | 0.5 |
| Water | 52 | 52 | 52 | 52 | 52 | 52 | 52 | 52 | 55 | 53 | 53 |
| Carboxylated Styrene-butadiene latex (45%) | 82 | 82 | 82 | 82 | 82 | 82 | 82 | 84 | 87 | 84 | 84 |
| Sodium alkyl-aryl sulfonate (45%) | 2 | 2 | 2 | 2 | 2 | 2 | 2 | 2 | 2 | 2 | 2 |
| Sodium Silicate(37%) | | | | | | | | | 102 | | |
| LUDOX AS-Ammonia (30%SiO$_2$) stabilized colloidal silica | | 83 | 208 | 415 | 622 | 747 | 830 | 122 | | | 122 |
| LUDOX 48-Lithium Stabilized colloidal silica (20%SiO$_2$) | | | | | | | | | | 76 | |
| RUST-BAN 191 (27%) | 830 | 747 | 622 | 415 | 208 | 83 | | 706 | 732 | 706 | 706 |
| Defoamer | 1 | 1 | 1 | 1 | 1 | 1 | | 1 | 1 | 1 | 1 |
| IPA Amine | | | | | | | | | | | 113* |
| Urea | | | | | | | | | | | 69* |
| TOTALS | 967.5 | 967.5 | 967.5 | 967.5 | 967.5 | 967.5 | 966.5 | 967.5 | 979.5 | 922.5 | 1081.5 |
| R/B 191 LEVEL | 100% | 90% | 75% | 50% | 25% | 10% | | RB 193; Ludox as for Sodium Silicate | RB 193 | RB 193; Ludox 48 for Sodium Silicate | |

*Monoisopropanolamine .5147 Based on Solids
Urea 31.16% Based on Solids
Vehicle to dust ratio: Part A 1.00, Part B 3.26
(1) Example IV
(2) Example I
(3) Plant Batch
(4) RUST-BAN 193 (RB193) is a trademark of Exxon Chemical Company

TABLE II

PROPERTIES OF COLLOIDAL SILICA MODIFIED WATER RESISTANT FORMULATIONS

| | Hardness 6 Hr. at 50°F—50% RH | Adhesion to Face of Q Panel | Resistance to Redissolving (6 hrs. at 50°F-50% RH then 18 hrs. at 100% RH | Recovery After 100% Humidity Cycle (24 hrs. at Room Temp.) | Stabilized Methanol Resistance (Immersed) | % $NH_3$ Colloidal $SiO_2$ based on total $SiO_2$ |
|---|---|---|---|---|---|---|
| A RB191 | 2H | 0 | 3* | 4–5* | 10 | 0.0 |
| B | 2H | 8 | 3 | 5 | | 10.5 |
| C | 2H | 7 | 7–8 | 6 | | 27.00 |
| D | H | 6 | 7 | 8–9 | | 52.64 |
| E | Gelled | — | — | — | 76.88 | |
| F | Gelled | — | — | — | 90.90 | |
| G | Gelled | — | — | — | 100.00 | |
| H (Plant Batch) | 3H–4H | 8 | 8 | 7 | 10 | 16.15 |
| I RB193 | 4H–5H | 9 | 3 | 3–4 | | 0.00 |
| J | 3H–4H | 8 | 6 | 7 | | 0.00 |
| K | B | 7 | 9 | 10 | 2 | 16.15 |
| L Ethyl Silicate | H–2H | 10 | 10 | 10 | 10 | RB188 0.00 |
| Sodium-Lithium Silicate | 3H | Complete loss of adhesion | 3 | 4–5 | 10 | RB191 0.00 |
| Sodium-Lithium Silicate-Latex | 3H | 10 | 3 | 3 | 10 | 0.00 |

Notes
10 = perfect, 1 = complete failure
Samples B–J (except H) were not checked for solvent resistance.

As can be seen in the above TABLE II the films resulting from coatings formulated according to the TABLE I formulations with zinc dust in a ratio of 1 part of binder formulation and 3.26 parts of zinc dust were tested with various results. The E, F, and G systems were so reactive with the zinc that the coating compositions gelled and were ineffective. This is an illustration of the basic difficulty with the use of ammonia stabilized colloidal silica which the art says not to use as is taught in U.S. Pat. No. 3,320,082.

The essense of the instant invention is to find a way of utilizing the reactivity of the ammonia stabilized system in such a manner that rapid cures (within two hours) can be accomplished, without encountering the over-reactivity problem normally seen with the ammonia stabilized colloidal silica.

It will be noted that in TABLE II organic system L, which is an ethyl silicate based formulation performs excellently across the board. Composition K which is a composition of the invention comprising additional amine and urea components also performs almost as well as the organic based silicate.

RUST-BAN 191 is a commercial formulation which is described in U.S. Pat. No. 3,180,746 and can be considered as an aqueous solution of a mixture of lithium and sodium silicates. When RUST-BAN 191 is modified by the addition of a sodium silicate, as in composition I, the resistance to water and humidity become quite poor. When RUST-BAN 191 is modified by the inclusion is an ammonia stabilized colloidal silica as in composition H the resistance to water and humidity is quite good, although not quite in the same class as composition K.

Compositions C and B also contain quantities of ammonia stabilized colloidal silica; in the case of composition B, the amount is insufficient to give outstanding properties. In the case of composition C, the amount of the ammonia stabilized silica is too great to be optimum.

The coating compositions of the instant invention are usually packaged as a two-component system. The zinc dust or any other solid pigment used in the coating composition is packaged as one separate component. The vehicle of the present invention together with any other liquid additives is packaged as a second component. The two components are mixed prior to the application of the mixture to the desired surface.

Since the coating compositions of this invention become waterinsensitive within an extremely short period of time, i.e., within two hours, they do not ordinarily require the use of a curing agent. However, in some exceptional cases curing agents such as phosphoric acid could be used to accelerate the cure when exceptionally adverse circumstances are encountered.

To the vehicles of the present invention is added zinc dust to form zinc-enriched coating compositions. The vehicles and zinc dust are formulated in accordance with the following general formula:

| | Parts by Weight | Optimum | |
|---|---|---|---|
| Vehicle (26% NVM) | 33 | 23.4 | 20 |
| Zinc dust | 67 | 76 .6 | 80 |
| | | 100.00 | |

The coating compositions are described in terms of total weight. Thus, the vehicle when expressed as 26% NVM, means 26% non-volatile materials or total solids.

The zinc has a particle size between 2 to about 50 microns in diameter. The zinc may be added in an amount from 66% to about 80% by weight of the coating composition, and the coating compositions will impart increasing corrosion resistance to metal, especially carbon steel, as the amount of zinc is increased.

In addition to the composition previously discussed, certain other materials, generally referred to as pigments, may be added singly, collectively, or in various combinations to impart certain desired properties to the coating compositions. Several of these "pigment additives" and the desirable characteristics they provide are as follows:

1. Inorganic ceramic pigments (metallic oxides which alone or in various combinations yield desired colors) — Examples of the metallic oxide pigments are cobalt/aluminum, cobalt/chrome, cadmium, and cadmium aluminum. The preferred pigments are those commonly used in tinting ceramics.

2. Zinc oxide pigment — Enhances the abrasion resistance and overall "smoothness" of the coating surface by contributing comparatively minute (0.1–1 micron diameter) particles to the coating formulation.

3. Aluminum silica-phosphate pigment — Performs the same function as zinc oxide.

4. Titanium dioxide pigment — In addition to enhancing the abrasion resistance of the coating, titanium dioxide contributes the excellent hiding properties (brought about by a very high index of refraction).

The coating compositions of the present invention may be applied to metal surfaces which have been prepared by commercial sandblasting techniques or by wire brushing. The sandblasting need only to remove loose mill scale and rust, and need not be sandblasted to white metal as is required for the commercially available prior art zinc-rich inorganic coating compositions. The coating compositions are applied to the surface by brushing, rolling or spraying to obtain a dry film thickness of about 1 to 12 mils in thickness. A preferred dry film thickness, a wet film of about 6 to 10 mils of the coating composition is applied to the surface.

Although the term "organic silicate" has been used herein, strictly speaking the term is used too loosely and is meant herein to refer only to organic quaternary ammonium silicates as opposed to organic silicates such as alkyl, or alkoxy or aryl silicates which have no ammonium functionality. In the same vein, although amine silicates are sometimes referred to herein, it is meant ammonium silicates in which the amine is present in the form of a positive ammonium ion.

Colloidal silicas are commercially available such as LUDOX 48 which is a lithium stabilized colloidal silica obtainable from the Dupont Company. Other commercial sources of alkali stabilized colloidal silicas are the Sytons from Monsanto Chemical Company and Nalcoag, sold by the National Aluminate Company. In general, such colloidal silica or silicates dispersions are described in U.S. Pat. No. 3,320,082, U.S. Pat. No. 2,462,763, U.S. Pat. No. 2,440,969, all of which are here incorporated in their entirety by reference.

The preferred alkaline-lithium silicate solutions used in the present invention can be obtained by the addition of a sodium silicate solution to a sodium-lithium silicate solution having a molar ratio of 0.25 $Na_2O$ : 0.75 $Li_2O$ : 4.5 $SiO_2$ made in accordance with the disclosure of U.S. 3,180,746 and having a solids content of 25 to 30 percent by weight and a viscosity of between 30 to about 40 centipoises (77°F.). Sodium silicate solutions having molar ratios of $Na_2O$ : $SiO_2$ of between 1 : 2.4 to about 2 : 3.75 may be added to the foregoing described sodium-lithium silicate solution to produce the alkali-lithium silicate solutions of the present invention. It is to be understood, however, that the alkali-lithium silicate solutions may also be produced directly by the method disclosed in U.S. Pat. No. 3,180,746 by adjusting the amounts of lithium hydroxide, and sodium, potassium, or quaternary ammonium hydroxide added to the silica-containing materials such as silicic acid or silica gel before heating.

Furthermore, the alkali-lithium silicate solutions may be obtained by the addition of lithium hydroxide and sodium, potassium or quaternary ammonium hydroxide to alkali stabilized colloidal silica solutions.

A typical lithium-sodium silicate solution which can be used as the one of the formulation components of the invention can be formed in the following manner:

Water, silica gel, lithium hydroxide, and sodium hydroxide are charged into a stainless steel pressure vessel equipped with an agitator. During the initial mixing of these ingredients, evolution of heat raises the temperature of the contents to 50° C. to 55° C. The reactor is then sealed and the temperature of the reactants, under a continual agitation is raised to 150° C. for a period of time, which may vary from 30 to 90 minutes. After the vessel reaches about 150° C. and about 70 psi pressure, the contents are slowly cooled at a rate of about 0.61° C. to about 1.83° C. per minute. This will result in a temperature drop from 150° C. to about 95° C. within about 30 to 90 minutes. This completes the initial part of the reaction which forms the solid sodium-lithium silicates.

The second part of the operation (below 95° C.) requires a longer period of time in order to effectively dissolve the solid silicates at the lower temperatures. The reduction of the temperature of the reactor contents from 95° C. to 40° C. is at a rate of about 0.37° C. to 0.416° C. per minute and is accomplished in 150 minutes to 240 minutes. The last temperature drop from 40° C. to 25° C. may be conducted over a period of 60 to 120 minutes and a cooling rate of about 0.25° C. to about 0.125° C. per minute.

Depending on the amount of water used, the vehicle may be used in different solid ratios, i.e., the total solids of the vehicle may vary from about 10% to 45% by weight, preferably the solid contents is between about 25% to about 30% by weight.

The ammonium stabilized colloidal silica is present at from about 10 to 60, preferably 20 to 50, most preferably 30 to 50 percent by weight of the $SiO_2$ (silica) content on a solids basis. The especially preferred range is 15% to 25% by weight and optimum is 20% by weight of the fugitive ion (ammonia) stabilized colloidal silica. Silicas such as lithium stabilized colloidal silica, lithium silicate, and quaternary ammonium silicates are preferably present in concentrations from 40 to 90 percent by weight of the total silica content. Such silicates can also be used in any combination together to make up the 40 to 90 weight percent silica content specified.

These vehicles are used to form zinc rich coatings in which the liquid vehicle is preferably 20 to 33 parts by weight of the coating composition and zinc dust is 67 to 80 parts by weight.

The zinc dust is most preferably in the form of a metalic powder with an average particle size of from 5 to 15 microns.

Other colorant pigments can be used in small percentages of from 1/10 to 10 percent based on the weight of the zinc dust. Metalic dusts such as aluminum, etc., can also be used partially or fully to replace the preferred zinc dust.

What is claimed is:

1. A liquid composition especially well adapted to function as a vehicle from which especially fast-curing water-resistant coatings can be obtained comprising in combination:

I. 10 to 45 percent by weight of solids comprising:
  A. From about 10 to 60 weight percent solids of fugative $NH_4^+$ ion stabilized colloidal silica based on total silica solids in said composition:
  B. The 90 to 40 weight percent balance of silica solids comprising silica or silicate containing materials: selected from the group consisting essentially of:
    1. Organic quaternary ammonium silicates;
    2. Alkali stabilized colloidal silicates;
    3. Alkali metal silicates selected from the group consisting of:
      a. potassium silicates
      b. lithium silicates
      c. sodium-lithium silicates and;
    4. Mixtures of the foregoing
II. 90 to 55 weight percent of water.

2. A relatively long shelf life composition capable of curing to water resistant coatings within two hours of application as a film comprising in combination:
  I. 50 to 90 weight percent metallic dust capable of entering into an $SiO_2$ polymerization;
  II. 10 to 50 weight percent of the composition of claim 1.

3. The composition of claim 2 wherein said metallic dust is zinc.

4. The composition of claim 2 wherein said metallic dust is aluminum.

5. The composition of claim 2 wherein pigments are also included.

6. The composition of claim 2 wherein the particle size of said dust is from about 5 to 15 microns.

7. A thin dry water-resistant film formed from a thin wet supported film, having a thickness of 6 to 10 mils, of the composition of claim 2.

8. The composition of claim 1 wherein said 90 to 40 weight percent solids component is an organic quaternary ammonium silicate.

9. The composition of claim 1 wherein said 90 to 40 weight percent solids component is an alkali stabilized colloidal silica.

10. The composition of claim 1 wherein said 90 to 40 weight percent solids component is a potassium silicate.

11. The composition of claim 1 wherein said 90 to 40 weight percent component is a lithium silicate.

12. The composition of claim 1 wherein said 90 to 40 weight percent solids component is a sodium-lithium silicate.

13. The composition of claim 1 wherein said 90 to 40 weight percent solids component is a sodium-lithium silicate and wherein said metallic dust is zinc.

14. A thin dry water-resistant film formed from a thin wet supported film having a thickness of 6 to 10 mils of the composition of claim 2, wherein said 90 to 40 weight percent solids component is a sodium-lithium silicate and said metallic dust is zinc.

15. A process for the formation of thin dry water-resistant protective films from wet films within two hours of wet film formation which comprises in combination:

A. Preparation of the silicate or colloidal silica solids in aqueous carrier fugative ion stabilized vehicle of claim 1

B. Blending said vehicle with 9 to 50 weight percent of metallic dust to form the composition of claim 2;

C. Applying said claim 2 composition to an appropriate substrate to form said wet film, drying under ambient conditions to permit the rapid removal of said fugative ion from said film and thereby effecting a rapid reduction in the pH of the coating and a concomitant rapid formation of a crosslinked water-resistant film and wherein said ambient conditions include the normal amount of $CO_2$ in the air which tends to neutralize remaining non-fugative alkaline components in the film.

16. The process of claim 15 wherein said metallic dust is zinc.

17. The process of claim 15 wherein said metallic dust is aluminum.

18. The process of claim 15 wherein said 90 to 40 weight percent solids component is a lithium silicate or a sodium-lithium silicate, said metallic dust is zinc and said fugative ion is $(NH_4)+$.

* * * * *